United States Patent [19]

De Luca

[11] 3,852,539

[45] Dec. 3, 1974

[54] LINE SURGE PROTECTION DEVICE FOR TELEPHONE LINES

[75] Inventor: Paul V. De Luca, Port Washington, N.Y.

[73] Assignee: Porta Systems Corp., Syosset, N.Y.

[22] Filed: Sept. 10, 1973

[21] Appl. No.: 395,386

[52] U.S. Cl. .................................. 179/174, 307/93
[51] Int. Cl. ........................ H04m 1/74, H03k 17/00
[58] Field of Search ............ 179/174, 175, 175.3 R; 307/92, 93, 94

[56] References Cited

UNITED STATES PATENTS

| | | | |
|---|---|---|---|
| 3,368,110 | 2/1968 | Taylor | 307/93 |
| 3,725,613 | 4/1973 | Allen et al. | 179/175.3 R |
| 3,793,535 | 2/1974 | Chowdhuri | 307/93 |

*Primary Examiner*—Kathleen H. Claffy
*Assistant Examiner*—Douglas W. Olms
*Attorney, Agent, or Firm*—Charles E. Temko

[57] ABSTRACT

A line voltage surge protection device for telephone systems which normally include means for grounding excessive currents caused by strokes of lightening and the like. The device includes a gaseous discharge element which becomes conductive when the voltage in the line being protected momentarily exceeds a predetermined value to conduct current to a source of ground potential. A temperature sensitive element which operates upon the presence of a prolonged current serves to short the gaseous discharge element whereby the surge is conducted directly to ground potential. The temperature sensitive element includes means resiliently biasing the gaseous element for movement in a direction serving to short the same. A soldered retaining means opposes such movement, and heat developed in a coil in series with the line to be protected melts the solder permitting the shorting action to occur.

3 Claims, 11 Drawing Figures

PATENTED DEC 3 1974

3,852,539

SHEET 1 OF 3

LINE SURGE PROTECTION DEVICE FOR TELEPHONE LINES

BACKGROUND OF THE INVENTION

This invention relates generally to the field of electrical protective devices, and more particularly to a device for temporatily grounding a telephone line, portions of which have been struck by lightening, or which suddenly receive a surge of excessive current caused by an increase in voltage. Devices of this general type are known in the art, and the invention lies in specific constructional details which permit improved ease of manufacture, at lowered cost, the possibility of repair of the devices for reuse, and improved reliability.

It is known in the art to provide means for selectively ground telephone lines during the period of excessive surges of current. While this action temporarily renders the line inoperative, it saves the occurrence of permanent damage to the line, with the corresponding requirement of repair. It is known in the art to provide devices which provide a temporary grounding effect for surges of relatively short duration, and a fuse type device which must be manually reset in the cases of surges of longer duration. Prior art devices, however, have been relatively expensive, both in the manufacture of the same and the relatively high replacement rate during normal operation, since once the fused element has been blown, it is not possible to reuse the device.

BRIEF DESCRIPTION OF THE PRESENT INVENTION

Briefly stated, the invention contemplates the provision of a device which may be self-contained and readily inserted into a conductive line grounding an individual telephone line in which a first means in the form of a gaseous discharge device provides for protection against line surges of relatively short duration, and a fuse device operating in conjunction therewith allows semi-permanent grounding of the line until the device is replaced with a fresh unit. Fusing action is obtained by mounting the gaseous discharge device for movement under the resilient urging of a spring from a position in which it is in series with the grounding line to a position in which it is shorted to permit the voltage surge to flow directly to ground potential. This movement is resisted by a blocking member held in blocking position by meltable solder, the solder being melted by a heating coil placed in series with the telephone line to be protected upon the occurrence of an extended surge. After a single protective use, the device may be reset with fresh solder for reuse. In the preferred embodiment, separate protective devices are provided for both the ringing circuit and the speaking circuit.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 9:
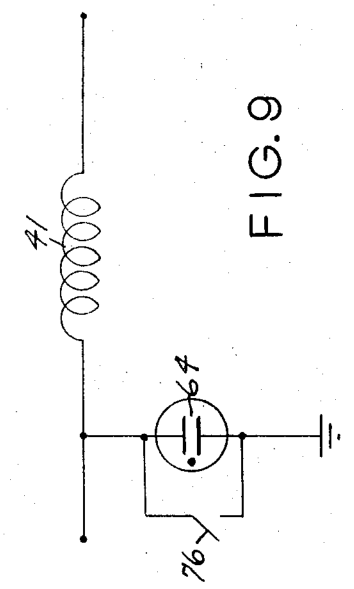
FIG. 9 is a schematic electrical wiring diagram showing the operation of the embodiment.
Figure 1:
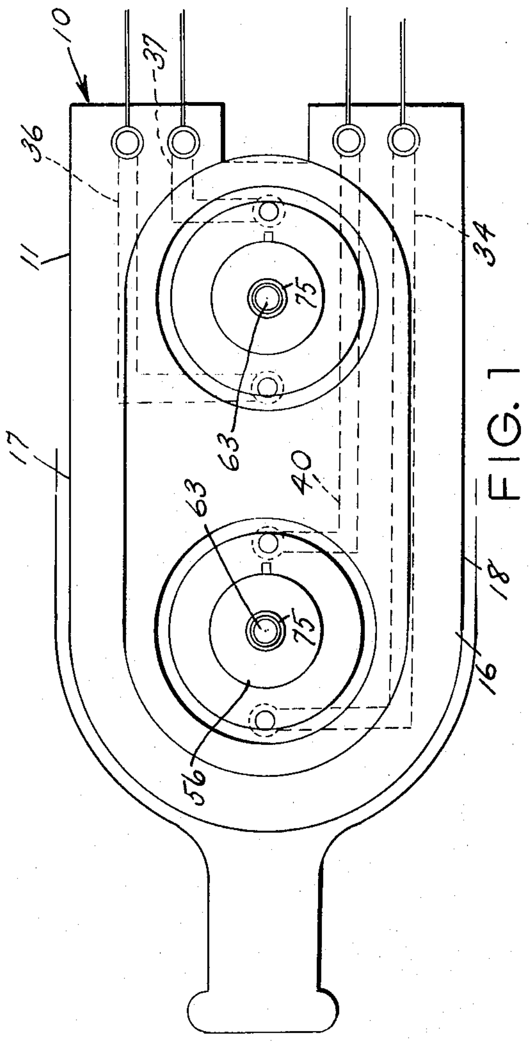
FIG. 1 is a fragmentary horizontal sectional view of an embodiment of the invention as seen from the plane 1—1 in FIG. 2.

In accordance with the first embodiment of the invention, the device, generally indicated by reference character 10, comprises broadly: a housing element 11, a grounding prong element 12, circuit connecting means 13, and temperature sensitive circuit grounding means 14.

Figure 4:
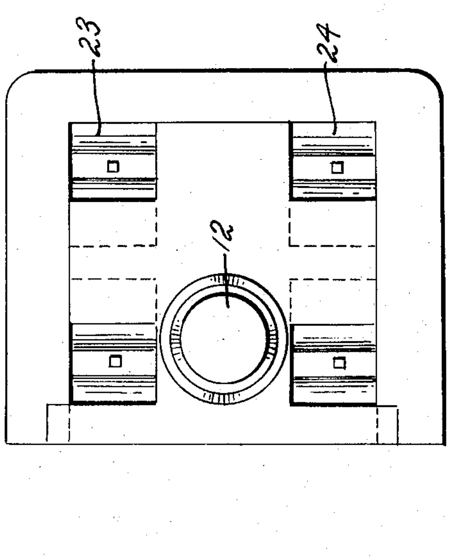
FIG. 4 is an end elevational view as seen from the right hand portion of FIG. 3.

The housing element 11 is preferably formed from suitable synthetic resinous materials, and includes a main body 16 bounded by side walls 17 and 18, an upper wall 19 and a lower wall or base 20. A manually engageable grip 21 is preferably integrally molded to the body 16. Disposed at an end opposite from the grip 21 is a surface 22 having first and second pairs of openings 23 and 24 (FIG. 4) for the engagement of jack structures interconnecting the ringing and speaking circuits of an individual telephone line.

Figure 7:
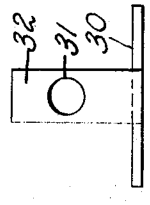
FIG. 7 is an end elevational view as seen from the right hand portion of FIG. 6.
Figure 5:
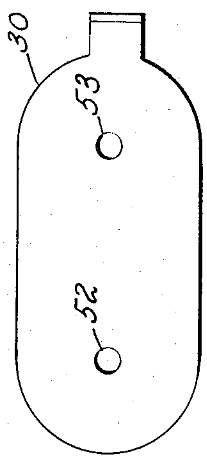
FIG. 5 is a view in elevation of a grounding plate forming a part of the embodiment.
Figure 6:
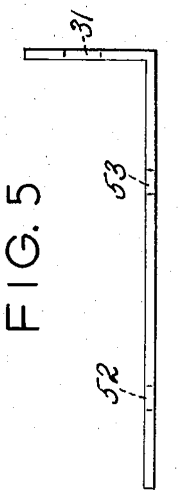
FIG. 6 is a view in elevation as seen from the lower portion of FIG. 5.

The grounding prong element 12 interconnects in conventional manner with a source of ground potential. It includes a supporting sleeve 27 preferably integrally molded with the body 16 and a metallic prong 28 of standardized configuration which engages a metallic plate 30 (FIGS. 5, 6 and 7) in an opening 31 in an angularly disposed portion 32.

The circuit connecting means 13 includes a plurality of expandable resilient members 35. One pair of such members interconnects with wires 36 and 37 leading to a heating coil 38. A second pair interconnects wires 39 and 40, respectively, communicating with a second heating coil 41.

Figure 2:
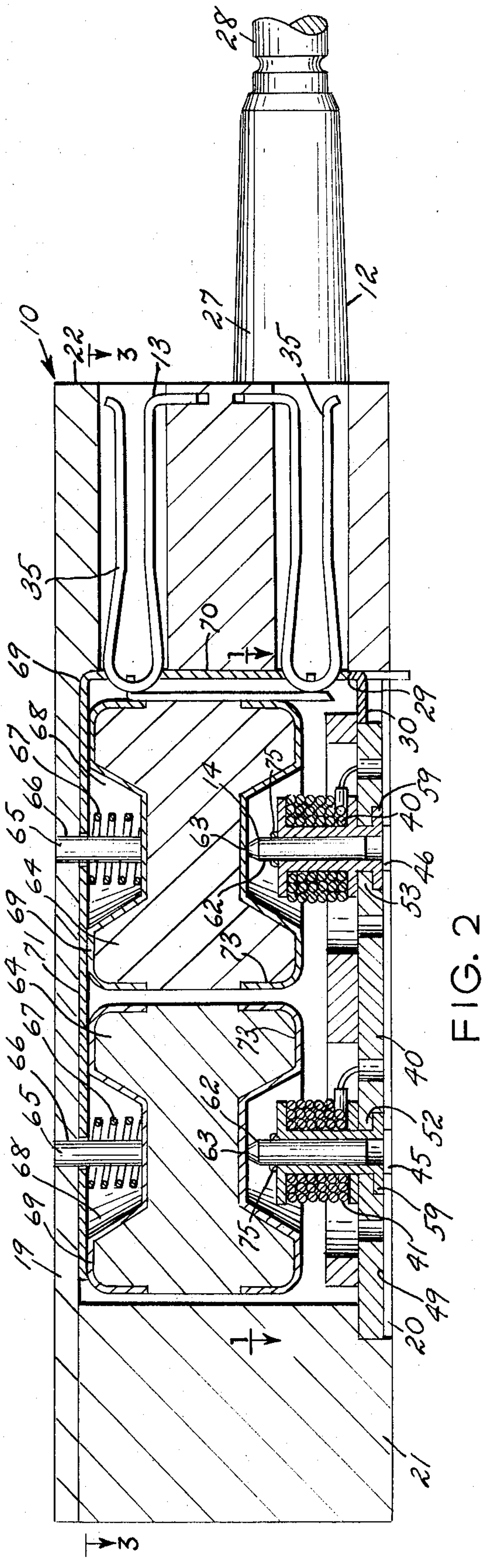
FIG. 2 is a vertical offset longitudinal sectional view as seen from the plane 2—2 in FIG. 3.
Figure 3:
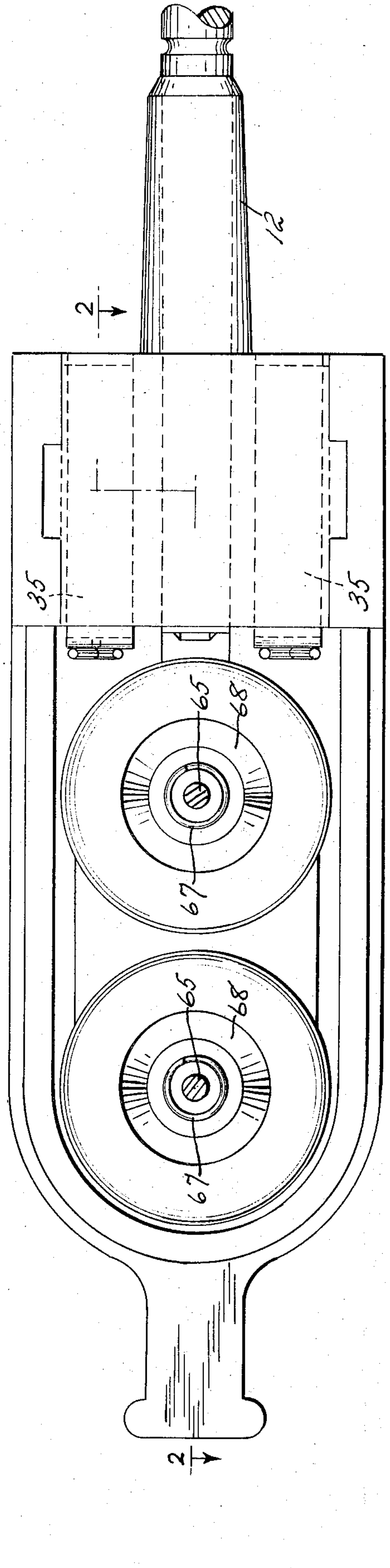
FIG. 3 is a top plan view of the embodiment with certain of the component parts removed for purposes of clarity.
Figure 8:
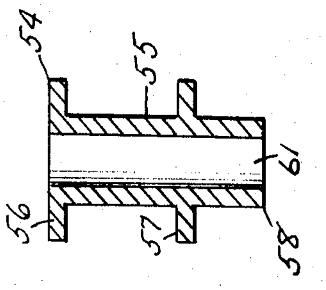
FIG. 8 is a longitudinal central sectional view of a heating coil supporting element forming a part of the discloded embodiment.

The temperature sensitive circuit grounding means 14 is best understood from the consideration of FIGS. 3, 5, 6 and 9. The means 14 is disposed within a cavity 44 in the main body 16, and includes first and second elements 45 and 46, respectively, both communicating with the plate 30. The plate 30 supports a floor member 40 (FIG. 2) which is insulated from the plate 30. The plate 40 includes two openings 52 and 53 (FIG. 6) which are engaged by a pair of heating coils and support element 54 (FIG. 8). The elements 54 are tubular in configuration, including a cylinder 55 having an upper flange 56 and a medially positioned flange 57. The lower end 58 is engaged with the plate 30 by heading over at 59, whereby the flanges 56 and 57 provide an annular space supporting a heating coil 40–41. A bore 61 in the cylinder 55 supports a stud 62 lightly soldered thereto, the upper end 63 of which projects to support a gaseous discharge device 64. The upper surface of the device 64 is provided with a shaft 65 which projects through an opening 66 in the cover 19 to be visible from the exterior of the device. The shaft 65 is surrounded by a small spring 67 which urges the device 64 downwardly as seen in FIG. 2, movement being prevented by the presence of the stud 62 under normal conditions. The lower end of the spring projects into a recess 68 at the upper portion of the device 64 which serves to maintain lateral displacement thereof. A conductive member 69 includes a first portion 70 which forms electrical contact with the members 23 and 24, and a second portion disposed at right angles thereto which overlies the upper conductive members 69 of both devices 64. A similar lower conductor 73 electrically communicates with the stud 62 which thereby establishes communication with the plate 30 and the associated prong 28.

During normal operation, ringing and speaking voltages will pass through the respective circuits, and through a respective heating coil 40–41, the normal voltage being insufficient to produce appreciable heating therein. With the occurrence of a momentary surge, above a predetermined voltage level, the gaseous discharge device becomes conductive, and the excess voltage is immediately shunted to ground potential. Should the voltage surge continue for any appreciable period of time, the heating coil 40–41 will reach an elevated temperature sufficient to melt the solder 75 retaining the stud 62 in the position shown in FIG. 2, and with such melting, the spring 67 urges the gaseous discharge device downwardly to a point where the lower conductive shell 73 contacts the upper flange 56, thus effectively shorting the device 64. This movement also causes the lower end of the stud 62 to project outwardly from the base 20 of the housing element 11, whereby the condition of the device may be readily observed by authorized personnel, and an appropriate replacement made. The replaced device can be readied for subsequent use by returning the stud 62 to its initial condition and resoldering the same, following which the device is again reassembled.

The above described operation is graphically illustrated in FIG. 9, wherein the open terminal 76 symbolically represents the gap existing between the lower shell of the device 64 and the upper flange 56 of the element 54.

Figure 10:
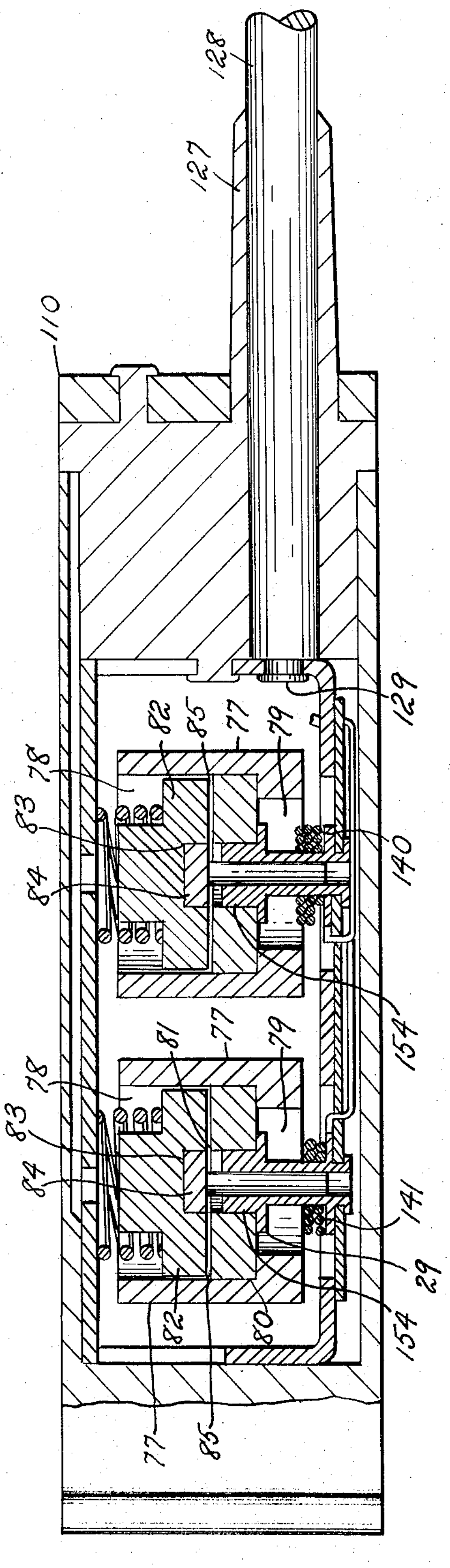
FIG. 10 is a longitudinal central sectional view of a second embodiment of the invention, as seen from the plane 10—10 in FIG. 11.
Figure 11:
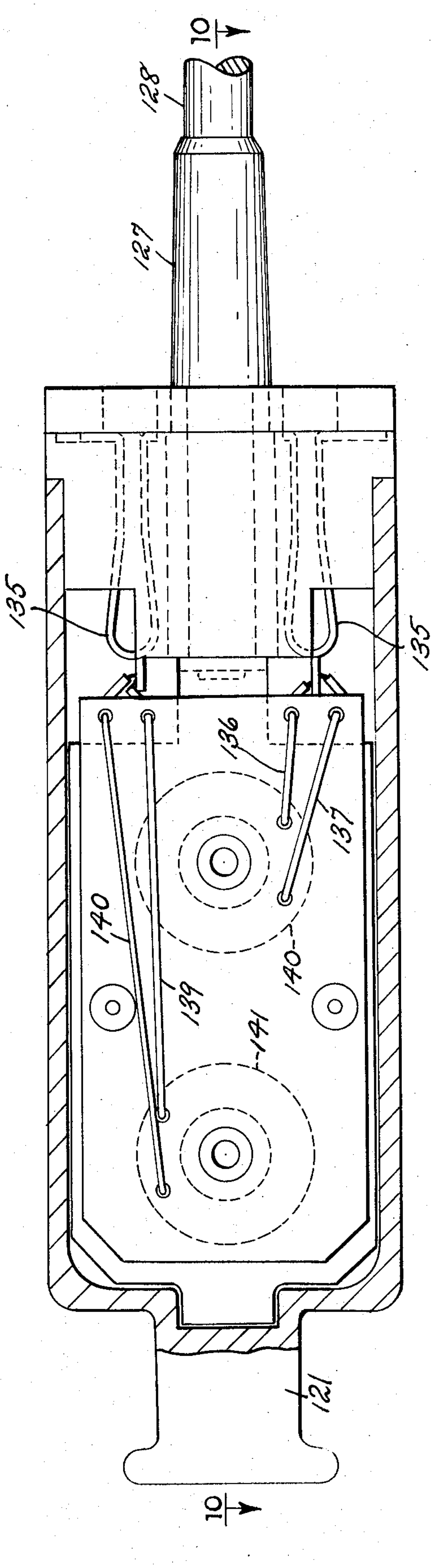
FIG. 11 is a top plan view of the second embodiment, partially broken away in section to show detail.

Turning now to the second embodiment of the invention, illustrated in FIGS. 10 and 11, parts corresponding to those of the first embodiment have been designated by similar reference characters, with the corresponding prefix "1."

The second embodiment differs from the first embodiment principally in the elimination of the gaseous discharge device 64, and the substitution therefore of a ceramic sleeve 77 having a bore 78. A first carbon block 80 is supported on an annular shoulder formed by a bushing 79. A second carbon block 82 is maintained in spaced relation with the first carbon block 80 in a manner similar to that in the first embodiment. In normal position, the first and second carbon blocks are separated from each other to define an air gap 85 which becomes ionized in the same manner as the gaseous discharge device 64 of the first embodiment. It will be understood by those skilled in the art to which the invention relates, that the term gaseous discharge device is intended to apply to structure shown in both the first and second embodiments.

I wish it to be understood that I do not consider the invention limited to the precise details of structure shown and set forth in this specification, for obvious modifications will occur to those skilled in the art to which the invention pertains.

I claim:

1. In a line voltage surge protective device for telephone systems, of a type adapted to conduct a surge to ground potential, and remain in non-conductive condition with respect to ground during normal operation, the improvement comprises: a housing defining a cavity, means on said housing for electrical interconnection to a line to be protected, and to a source of ground potential, a gaseous discharge device interconnecting said line and said source of ground potential operative to conduct a voltage substantially above normal operating voltage, and heat sensitive means connected in series with said line to be protected and operative to short said gaseous discharge device to permit excess current to be conducted directly to ground.

2. Structure in accordance with claim 1, said gaseous discharge device being disposed within said housing and supported for potential conduction by said heat sensitive means, resilient means urging said gaseous discharge device to shorting position against said heat sensitive means, said heat sensitive means including a meltable component, the melting of which terminates the support of said gaseous discharge device, and allows said resilient means to move said gaseous discharge device to shorting position.

3. Structure in accordance with claim 2, said heat sensitive means including a coil in series with said line to be protected in the proximity of said meltable component.

* * * * *